(12) United States Patent
Swei et al.

(10) Patent No.: US 7,641,964 B2
(45) Date of Patent: Jan. 5, 2010

(54) ROOFING MEMBRANE

(75) Inventors: Gwo S. Swei, Vandalia, OH (US); Viktor V. Skatchkov, Bloomingdale, NJ (US); Maryann C. Kenney, Foxboro, MA (US); David Bravet, Shrewsbury, MA (US)

(73) Assignee: Saint-Gobain Performance Pastics Corporation, Worcester, MA (US)

( * ) Notice: Subject to any disclaimer, the term of this patent is extended or adjusted under 35 U.S.C. 154(b) by 359 days.

(21) Appl. No.: 11/498,942

(22) Filed: Aug. 3, 2006

(65) Prior Publication Data

US 2008/0029210 A1 Feb. 7, 2008

(51) Int. Cl.
B32B 25/08 (2006.01)
B32B 25/16 (2006.01)
B32B 27/08 (2006.01)
B32B 27/32 (2006.01)

(52) U.S. Cl. .................. 428/215; 428/421; 428/422; 428/521; 428/523

(58) Field of Classification Search .................. None
See application file for complete search history.

(56) References Cited

U.S. PATENT DOCUMENTS

| | | | |
|---|---|---|---|
| 3,581,779 A | 6/1971 | Gilbert, Jr. | |
| 4,496,690 A * | 1/1985 | Grant et al. | 525/66 |
| 4,507,411 A | 3/1985 | Gordon et al. | |
| 5,334,450 A | 8/1994 | Zabrocki et al. | |
| 5,866,663 A | 2/1999 | Brookhart et al. | |
| 5,880,241 A | 3/1999 | Brookhart et al. | |
| 5,880,323 A | 3/1999 | Brookhart, III et al. | |
| 5,886,224 A | 3/1999 | Brookhart et al. | |
| 5,916,989 A | 6/1999 | Brookhart, III et al. | |
| 6,107,422 A | 8/2000 | Wang et al. | |
| 6,117,375 A | 9/2000 | Garrett et al. | |
| 6,140,439 A | 10/2000 | Brookhart et al. | |
| 6,288,156 B1 | 9/2001 | Hausmann | |
| 6,372,870 B1 | 4/2002 | Kitahara et al. | |
| 6,506,842 B1 | 1/2003 | Heck et al. | |
| 6,534,569 B2 | 3/2003 | Mahmud et al. | |
| 6,538,084 B2 | 3/2003 | Kitahara et al. | |
| 6,652,943 B2 | 11/2003 | Tukachinsky et al. | |
| 6,670,297 B1 | 12/2003 | Brookhart et al. | |
| 6,897,272 B1 | 5/2005 | Brookhart et al. | |
| 6,946,182 B1 | 9/2005 | Allgeuer et al. | |

(Continued)

FOREIGN PATENT DOCUMENTS

EP    0 137 519 B1    8/1991

(Continued)

OTHER PUBLICATIONS

Alproof; Tech Data Sheet; Hyload Roofing Systems; Wadsworth, OH, USA.

(Continued)

Primary Examiner—Ramsey Zacharia
(74) Attorney, Agent, or Firm—Larson Newman & Abel, LLP; Chi Suk Kim (57) ABSTRACT

A roofing material includes a first layer including a fluoropolymer, a second layer directly bonded to and directly contacting the first layer, and a third layer underlying the second layer. The second layer includes an unfunctionalized olefinic polymer. The third layer includes a polymeric material and a filler.

15 Claims, 4 Drawing Sheets

U.S. PATENT DOCUMENTS

| | | |
|---|---|---|
| 6,998,007 B2 | 2/2006 | Tukachinsky et al. |
| 7,070,843 B2 | 7/2006 | Bartek et al. |
| 2002/0027110 A1 | 3/2002 | Mahmud et al. |
| 2002/0128412 A1 | 9/2002 | Kitahara et al. |
| 2004/0081789 A1 | 4/2004 | Kim |
| 2004/0102591 A1 | 5/2004 | Brookhart et al. |
| 2004/0127614 A1 | 7/2004 | Jiang et al. |
| 2004/0137252 A1 | 7/2004 | Bonnet et al. |
| 2004/0229043 A1 | 11/2004 | Spohn et al. |
| 2004/0244316 A1 | 12/2004 | Macuga et al. |
| 2005/0025956 A1 | 2/2005 | Bainbridge |
| 2005/0123764 A1 | 6/2005 | Hoffmann et al. |
| 2005/0131119 A1 | 6/2005 | Wood |
| 2005/0143508 A1 | 6/2005 | Tyagi et al. |
| 2005/0187372 A1 | 8/2005 | Venderbosch et al. |
| 2006/0020076 A1 | 1/2006 | Finerman et al. |
| 2006/0029775 A1 | 2/2006 | MacKinnon et al. |
| 2006/0196596 A1 | 9/2006 | Bartek et al. |

FOREIGN PATENT DOCUMENTS

| | | |
|---|---|---|
| EP | 0736640 A | 10/1996 |
| EP | 0960724 A | 12/1999 |
| EP | 0 992 518 B1 | 9/2004 |
| EP | 1 541 337 A1 | 6/2005 |
| EP | 1 541 338 A1 | 6/2005 |
| EP | 1 541 642 A1 | 6/2005 |
| EP | 1 605 002 A1 | 12/2005 |
| GB | 994495 A | 6/1965 |
| WO | WO 98/32795 | 7/1998 |
| WO | WO 01/05573 A1 | 1/2001 |
| WO | 0136556 A | 5/2001 |
| WO | WO 01/55245 A2 | 8/2001 |
| WO | 02098657 A | 12/2002 |
| WO | WO 2004/065467 A1 | 8/2004 |
| WO | WO 2004/076541 A2 | 9/2004 |
| WO | WO 2004/101274 A2 | 11/2004 |
| WO | WO 2005/078808 A1 | 8/2005 |

OTHER PUBLICATIONS

ALPSAM50; Tech Data Sheet; Hyload Roofing Systems; Wadsworth, OH, USA.

Hyload CTEM Waterproofing WS; A Total System Warranty; Hyload Roofing Systems; Wadsworth, OH, USA.

"Standard Specification for EPDM Sheet Used In Single-Ply Roof Membrane"; Copyright by ASTM International; West Conshohocken, PA, USA.

"Standard Specification for Thermoplastic Polyolefin Based Sheet Roofing"; Copyright by ASTM International; West Conshohocken, PA, USA.

"Carlisle Sure-Flex Reinforced PVC Membrane"; Technical Data Bulletin; Carlisle Syntec Incorporated; Copyright by ASTM International; West Conshohocken, PA, USA; pp. 1-4.

Elizabeth R. Griffin; "Building a Better PVC"; DuPont Industrial Polymers; pp. 18-21.

"Flex MF/R 120 Elvaloy Roof System"; Flex Membrane International, Inc.; Morgantown, PA; pp. 1-2; Jul. 2003.

"Flex FB 100 Elvaloy Kee Roof System"; Flex Membrane International, Inc.; Morgantown, PA; pp. 1-2; Jul. 2003.

Flex Thermoplastic Single Ply and Multi-Ply Roofing Systems; Products & Services; Morgantown, PA; pp. 1-7.

"Oligo (2-Hydroxy-2-Methyl-1-4 (1-Methylvinyl) Propanone and 2-Hydroxy-2-Methyl-1-Phenyl Propan-1-One (Monomeric)"; Product Bulletin: Esacure KIP150; Sartomer Company, Inc.; Exton, PA, USA.

Dow Technical Information; Form No. 042-00073-0805; NORDEL IP 4725P, Hydrocarbon Rubber; pp. 1-2.

"Single-Ply Roofing Membranes: Performance vs. Thickness"; Duro-Last Roofing, Inc.; Performance vs. Thickness Sheet Jul. 2005—95083/M#DL25-0002.

SRI-Roof, Roofing Material Testing and Laboratory Services; Structrual Research Inc.; pp. 1-2.

Intertek ETL SEMKO; Roofing Products; pp. 1-3.

E. B. Trostyanskaya, et al.; "Effect of Powdered Mineral Fillers on the Crosslinking of Phenol-Formaldehyde Oligomers and the Mechanical Properties of the Molding Materials"; Moscow Aviation Tech. Institute; vol. 4, No. 6; pp. 1033-1042; 1968.

* cited by examiner

ROOFING MEMBRANE

FIELD OF THE DISCLOSURE

This disclosure, in general, relates to roofing membranes and methods for manufacturing same.

BACKGROUND

Within the construction industry, builders and building owners are seeking cost effective roofing solutions. In particular, builders and building owners are seeking low maintenance and long lasting roofing materials that provide protection against environmental hazards, such as rain, snow, hail, wind, heat, and ultraviolet radiation. Rain, snow, hail, and wind tend to cause structural damage to roofing membranes. Heat and ultraviolet radiation tend to cause changes in roofing materials, weakening the material and making the material more susceptible to structural damage, such as damage caused by rain, snow, hail, and wind.

In addition, builders and building owners are seeking roofing materials that are tear resistant and puncture resistant. Roofing materials undergo potential tear and puncture hazards during installation and construction. In addition, roofing materials may be exposed to puncture hazards during maintenance of equipment located on the roof, such as HVAC systems. Further, roofing materials may be exposed to puncture hazards resulting from wind blown debris or hail.

Also, roofing materials are often exposed to extreme heat and solar radiation. Ultraviolet radiation may cause long-term degradation of roofing materials. On a sunny day, roofing materials may experience heat that far exceeds the ambient temperature. For example, a typical black roof may be 70° F. (21° C.) or more higher than the ambient temperature on a sunny day. Aging caused by heat or ultraviolet radiation exposure over time may reduce the tear and puncture resistance of the film. In addition, such aging may cause a change in the dimensions of the film, such as shrinking or warping.

In addition builders and building owners are seeking roofs that maintain their appearance and aesthetics over time. A roofing material that is easy to clean, or resistant to the buildup of dirt will have a better appearance and lower maintenance costs. In particular, an easy to clean or dirt resistant surface on a light color roof will allow it to maintain its color and high reflectivity for a longer period to time.

Poor resistance to tears, puncture hazards, and aging, may result in films or membranes that over time leak when exposed to rain, delaminate as a result of heating and freezing processes, or lose insulative properties. When such problems arise, the roofing materials undergo expensive maintenance or complete replacement. A short lifetime of the roofing material or an increased frequency in maintenance results in higher overall lifetime costs associated with the roofing system. As such, an improved roofing membrane would be desirable.

SUMMARY

In a particular embodiment, a roofing material includes a first layer including a fluoropolymer, a second layer directly bonded to and directly contacting the first layer, and a third layer underlying the second layer. The second layer includes an unfunctionalized olefinic polymer. The third layer includes a polymeric material and a filler.

In another exemplary embodiment, a roofing membrane includes a first layer comprising a fluoropolymer, a second layer directly bonded to and directly contacting the first layer, and a third layer underlying the second layer. The second layer includes a diene elastomer. The third layer includes a polymeric material.

In a further exemplary embodiment, a roofing membrane includes a first layer comprising a fluoropolymer, a second layer directly bonded to and directly contacting the first layer, and a third layer underlying the second layer. The second layer includes a diene elastomer. The third layer includes an unfunctionalized olefinic polymer.

In an additional exemplary embodiment, a capping film includes a first layer comprising a fluoropolymer, and a second layer directly contacting the first layer absent an intervening layer. The second layer includes a polymer in an at least partially uncured state.

In another exemplary embodiment, a method of forming a roofing membrane includes laminating a capping film to a bulk layer. The capping film includes a first layer and a second layer. The first layer includes a fluoropolymer and the second layer includes an unfunctionalized olefinic polymer. The method also includes curing the bulk layer.

In a further exemplary embodiment, a method of forming a roofing membrane includes extruding a bulk layer to a capping film. The capping film includes a first layer and a second layer. The first layer includes a fluoropolymer and the second layer includes an unfunctionalized olefinic polymer. The bulk layer includes a polymeric material and a filler.

In an additional exemplary embodiment, a method of preparing a surface of an outdoor structure includes placing a roofing material on the surface of the outdoor structure. The roofing material includes a first layer including a fluoropolymer and a second layer bonded directly to and directly contacting the first layer. The second layer includes a diene elastomer. The method also includes securing the roofing material to the surface.

BRIEF DESCRIPTION OF THE DRAWINGS

The present disclosure may be better understood, and its numerous features and advantages made apparent to those skilled in the art by referencing the accompanying drawings.

DESCRIPTION OF THE DRAWINGS

In a particular embodiment, a roofing membrane includes a capping film and a bulk layer. For example, the capping film may include a first layer including fluoropolymer and a second layer including an unfunctionalized olefinic polymer. The first layer at least partially overlies the second layer and directly contacts and is directly bonded to the second layer. The capping film may be bonded or adhered to the bulk layer. The bulk layer may include an unfunctionalized olefinic polymer and filler. The roofing membrane may be incorporated onto a structure, such as a building. In particular, the roofing membrane may be placed on a skyward facing surface of the structure, such as a low-slope roof or a sloped roof.

In another exemplary embodiment, the roofing membrane may be formed by laminating the capping film to the bulk layer. For example, the capping film may be laminated to a bulk layer prior to curing, cross-linking, or cooling the bulk layer. In an example, the bulk layer may be extruded or calendared to the capping film. In another example, the bulk layer may be formed prior to laminating the bulk layer to the capping film. In a further example, the capping film may be adhered to the bulk layer using an adhesive layer.

In a further exemplary embodiment, a building is constructed by placing the roofing membrane on a surface of the structure, such as a roof, and securing the roofing membrane to the surface. For example, the roofing membrane may be adhered to the surface with an adhesive substance. Alternatively, the roofing membrane may be heat laminated to the surface.

Figure 1:
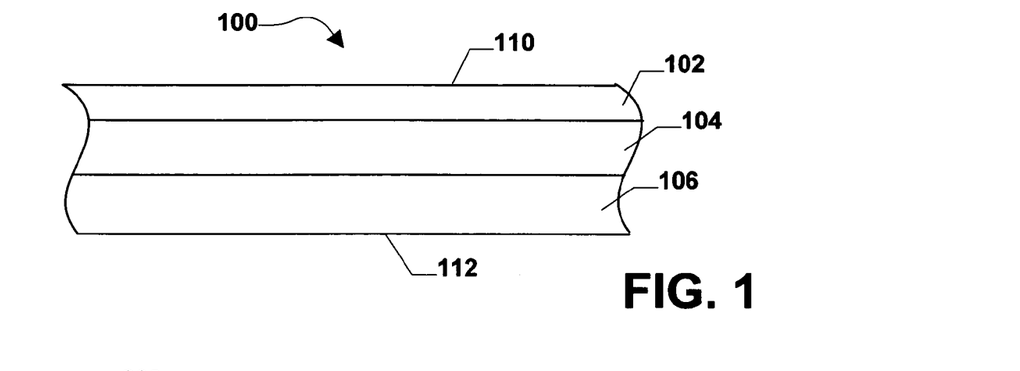
FIG. 1, FIG. 2, and FIG. 3 include illustrations of exemplary multi-layer construction for use in roofing systems.

FIG. 1 includes an illustration of an exemplary multi-layer film 100 that may be useful in a roofing membrane. For example, the multi-layer film 100 may be a capping layer for use in conjunction with a bulk layer. The film 100 may include an outermost layer 102 and a layer 104. The outermost layer 102 forms an outermost surface 110 that is typically exposed to ambient conditions when installed as part of a roofing membrane. The film 100 also includes a surface 112 that is typically adjacent to the surface of a bulk layer. For example, the surface 112 may be adhered to the bulk layer using an adhesive or through direct bonding to the bulk layer without intervening layers.

In a particular embodiment, the layer 102 is bonded directly to and directly contacts the layer 104. For example, the layer 102 may be directly bonded to and directly contact the layer 104 without an intervening adhesive layer. As illustrated, an optional layer 106 may be formed to underlie layers 102 and 104. The layer 106 may be formed of a reinforcing material, an adhesive, a polymeric material, or any combination thereof. In particular, the optional layer 106 may be bonded directly to and directly contact the layer 104.

The layer 102 is generally formed of a low surface energy material. For example, a low surface energy polymer may be used to form a low surface energy surface. In an example, a low surface energy polymer includes a fluoropolymer. An exemplary fluoropolymer may be formed of a homopolymer, copolymer, terpolymer, or polymer blend formed from a fully or partially fluorinated monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. An exemplary fluoropolymer includes a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), ethylene-perfluoroethylenepropene copolymer (EFEP), or any blend or any alloy thereof. For example, the fluoropolymer may include FEP. In a further example, the fluoropolymer may include PVDF. In an exemplary embodiment, the fluoropolymer may be crosslinkable through radiation, such as e-beam. An exemplary crosslinkable fluoropolymer may include ETFE, THV, PVDF, or any combination thereof. A THV resin is available from Dyneon 3M Corporation Minneapolis, Minn. An ECTFE polymer is available from Ausimont Corporation (Italy) under the trade name Halar. Other fluoropolymers described herein may be obtained from Daikin (Japan) and DuPont (USA). In particular, FEP fluoropolymers, such as NP-12X, are commercially available from Daikin.

In an example, the layer 102 includes at least about 70 wt % fluoropolymer, such as at least about 75 wt %, or even at least about 80 wt % fluoropolymer. In a particular example, the layer 102 is formed substantially entirely of fluoropolymer, such as including substantially 100% fluoropolymer. Alternatively, the layer 102 may include a pigment, a UV absorber, or another additive described below, or any combination thereof.

In an exemplary embodiment, the layer 102 has a thickness not greater than about 100 micrometers. For example, the thickness of the layer 102 may be not greater than about 50 micrometers, such as not greater than about 25 micrometers, or even, not greater than about 12 micrometers.

In an exemplary embodiment, the layer 104 may include an unfunctionalized olefinic polymer. Herein, unfunctionalized olefinic polymer includes a homopolymer or a copolymer formed from at least one alkylene monomer and is not formed from a monomer including a functional group that includes a halogen, oxygen, nitrogen, sulfur, or phosphorous. For example, an unfunctionalized olefinic polymer may include a polyolefin or a diene elastomer. An example of the unfunctionalized olefinic polymer includes a polyolefin homopolymer, such as polyethylene, polypropylene, polybutene, polypentene, or polymethylpentene; a polyolefin copolymer, such as ethylene-propylene copolymer, ethylene-butene copolymer, or ethylene-octene copolymer; a diene elastomer, such as an ethylene propylene diene monomer (EPDM) elastomer; a thermoplastic olefin (TPO); or any blend or combination thereof. In a particular example, the unfunctionalized olefinic polymer includes a thermoplastic olefin (TPO). An exemplary polyethylene includes high density polyethylene (HDPE), medium density polyethylene (MDPE), low density polyethylene (LDPE), ultra low density polyethylene, or any combination thereof.

In a particular embodiment, the layer 104, for example, may be formed of an elastomeric material. In a particular embodiment, the elastomeric material includes a crosslinkable elastomeric polymer. For example, the layer 104 may include a diene elastomer. In a particular example, the elastomeric material includes a blend of a diene elastomer and a polyolefin. In an exemplary embodiment, the diene elastomer is a copolymer formed from at least one diene monomer. For example, the diene elastomer may be a copolymer of ethylene, propylene and diene monomer (EPDM). An exemplary diene monomer includes a conjugated diene, such as butadiene, isoprene, chloroprene, or the like; a non-conjugated diene including from 5 to about 25 carbon atoms, such as 1,4-pentadiene, 1,4-hexadiene, 1,5-hexadiene, 2,5-dimethyl-1,5-hexadiene, 1,4-octadiene, or the like; a cyclic diene, such as cyclopentadiene, cyclohexadiene, cyclooctadiene, dicyclopentadiene, or the like; a vinyl cyclic ene, such as 1-vinyl-1-cyclopentene, 1-vinyl-1-cyclohexene, or the like; an alkylbicyclononadiene, such as 3-methylbicyclo-(4,2,1)-nona-3, 7-diene, or the like; an indene, such as methyl tetrahydroindene, or the like; an alkenyl norbornene, such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, or the like; a tricyclodiene, such as 3-methyltricyclo $(5,2,1,0^2,6)$-deca-3,8-diene or the like; or any combination thereof. In a particular embodiment, the diene includes a non-conjugated diene. In another embodiment, the diene elastomer includes alkenyl norbornene. The diene elastomer may include, for example, ethylene from about 63 wt % to about 95 wt % of the polymer, propylene from about 5 wt % to about 37 wt %, and the diene monomer from about 0.2 wt % to about 15 wt %, based upon the total weight of the diene elastomer. In a particular example, the ethylene content is from about 70 wt % to about 90 wt %, propylene from about 17 wt % to about 31 wt %, and the diene monomer from about 2 wt % to about 10 wt % of the diene elastomer. The diene elastomer typically has a Mooney viscosity of at least about 20, such as about 25 to about 150 (ML 1+8 at 125° C.). In an exemplary embodiment, the diene elastomer has a dilute solution viscosity (DSV) of at least about 1, such as about 1.3 to about 3 measured at 25° C. as a solution of 0.1 grams of diene polymer per deciliter of toluene. Prior to crosslinking, the diene elastomer may have a green tensile strength of about 800 psi to about 1,800 psi, such as about 900 psi to about 1,600 psi. The uncrosslinked diene elastomer may have an elongation at break of at least about 600 percent. In general, the diene elastomer includes a small amount of a diene monomer, such as a dicyclopentadiene, a ethylnorbornene, a methylnorbornene, a non-conjugated hexadiene, or the like, and typically has a number average molecular weight of from about 50,000 to about 100,000. Exemplary diene elastomers are commercially available under the tradename Nordel from Dow, such as Nordel IP 4725P.

In a particular embodiment, the material of layer 104 includes greater than about 40 wt % of the diene elastomer. For example, the layer 104 may include greater than about 50 wt % diene elastomer, such as greater than about 65 wt %, greater than about 80 wt %, or even, greater than about 90 wt % of the diene elastomer. In a particular example, the material of layer 104 consists essentially of a diene elastomer, such as EPDM.

In an exemplary embodiment in which layer 104 includes a blend of EPDM and polyolefin, the polyolefin of the blend may include a homopolymer, a copolymer, a terpolymer, an alloy, or any combination thereof formed from a monomer, such as ethylene, propylene, butene, pentene, methyl pentene, octene, or any combination thereof. An exemplary polyolefin includes high density polyethylene (HDPE), medium density polyethylene (MDPE), low density polyethylene (LDPE), ultra low density polyethylene, ethylene propylene copolymer, ethylene butene copolymer, polypropylene (PP), polybutene, polypentene, polymethylpentene, polystyrene, ethylene propylene rubber (EPR), ethylene octene copolymer, or any combination thereof. In a particular example, the polyolefin includes high density polyethylene. In another example, the polyolefin includes polypropylene. In a further example, the polyolefin includes ethylene octene copolymer. In a particular embodiment, the polyolefin is not a modified polyolefin, such as a carboxylic functional group modified polyolefin, and in particular, is not ethylene vinyl acetate. In addition, the polyolefin is not formed from a diene monomer. The polyolefin may have a degree of crystallinity. For example, the polyolefin may have at least about 35% crystallinity. In a particular example, the polyolefin may have a crystallinity of at least about 50%, such as at least about 60% or at least about 70% crystallinity. In a particular example, the polyolefin may be a high crystallinity polyolefin. Alternatively, the polyolefin may be a low crystallinity polyolefin, having a crystallinity not greater than 35%. Low crystallinity polyolefins may enhance conformability of release films or improve clarity. An exemplary commercially available polyolefin includes Equistar 8540, an ethylene octene copolymer; Equistar GA-502-024, an LLDPE; Dow DMDA-8904NT 7, an HDPE; Basell Pro-Fax SR275M, a random polypropylene copolymer; Dow 7C50, a block PP copolymer; or products formerly sold under the tradename Engage by Dupont Dow. Another exemplary resin includes Exxon Mobil Exact 0201 or Dow Versify 2300.

In an example, the blend of EPDM and polyolefin may include not greater than about 40 wt % polyolefin, such as not greater than about 30 wt % polyolefin. For example, the blend may include not greater than about 20 wt % of the polyolefin, such as not greater than 10 wt %. In a particular example, the blend includes about 5 wt % to about 30 wt %, such as about 10 wt % to about 30 wt %, about 10 wt % to about 25 wt %, or about 10 wt % to about 20 wt %.

In general, the blend of EPDM and polyolefin exhibits compatibility between the polymeric components. DMA analysis may provide evidence of compatibility. DMA analysis may show a single tan delta peak between glass transition temperatures of major components of a blend, indicating compatibility. Alternatively, an incompatible blend may exhibit more than one tan delta peak. In an example, the blend may exhibit a single tan delta peak. In particular, the single tan delta peak may be between the glass transition temperature of the polyolefin and the glass transition temperature of the diene elastomer.

In an exemplary embodiment, the material of layer 104 may be cured through cross-linking. In a particular example, the unfunctionalized olefinic polymer may be crosslinkable through radiation, such as using x-ray radiation, gamma radiation, ultraviolet electromagnetic radiation, visible light radiation, electron beam (e-beam) radiation, or any combination thereof. Ultraviolet (UV) radiation may include radiation at a wavelength or a plurality of wavelengths in the range of from 170 nm to 400 nm, such as in the range of 170 nm to 220 nm. Ionizing radiation includes high-energy radiation capable of generating ions and includes electron beam (e-beam) radiation, gamma radiation, and x-ray radiation. In a particular example, e-beam ionizing radiation includes an electron beam generated by a Van de Graaff generator or an electron-accelerator. In an alternative embodiment, the unfunctionalized olefinic polymer may be crosslinkable through thermal methods. In a further example, the unfunctionalized olefinic polymer may be crosslinkable through chemical reaction, such as a reaction between a silane crosslinking agent and water.

In an exemplary embodiment, the material of layer 104 may include a crosslinking agent, a photoinitiator, a thermal initiator, a filler, a pigment, an antioxidant, a flame retardant, a plasticizer, or any combination thereof. Alternatively, the layers 104 may be free of crosslinking agents, photoinitiators, thermal initiators, fillers, pigments, antioxidants, flame retardants, or plasticizers. In particular, the layer 104 may be free of photoinitiators or crosslinking agents.

To facilitate crosslinking, the material of the layer 104 may include a photoinitiator or a sensitizer composition. For example, when ultra-violet radiation is contemplated as the form of irradiation or when e-beam radiation is contemplated as the form of irradiation, the material may include a photoinitiator to increase the crosslinking efficiency, i.e., degree of crosslinking per unit dose of radiation.

An exemplary photoinitiator includes a oligo (2-hydroxy-2-methyl-1-4 (1-methylvinyl)propanone and 2-hydroxy-2-methyl-1-phenyl propan-1-one monomeric, such as Esacure KIP150 from Sartomer. Another exemplary photoinitiator includes benzophenone, ortho- and para-methoxybenzophenone, dimethylbenzophenone, dimethoxybenzophenone, diphenoxybenzophenone, acetophenone, o-methoxy-acetophenone, acenaphthene-quinone, methyl ethyl ketone, valerophenone, hexanophenone, alpha-phenyl-butyrophenone, p-morpholinopropiophenone, dibenzosuberone, 4-morpholinobenzo-phenone, benzoin, benzoin methyl ether, 3-o-morpholinodeoxybenzoin, p-diacetyl-benzene, 4-aminobenzophenone, 4'-methoxyacetophenone, alpha-tetralone, 9-acetylphenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis(dimethylamino)-benzophenone, 1'-acetonaphthone, 2' acetonaphthone, acetonaphthone and 2,3-butanedione, benz[a]anthracene-7,12-dione, 2,2-dimethoxy-2-phenylaceto-phenone, alpha-diethoxy-acetophenone, alpha-dibutoxy-acetophenone, anthraquinone, isopropylthioxanthone, or any combination thereof. An exemplary polymeric initiator may include poly (ethylene/carbon monoxide), oligo[2-hydroxy-2-methyl-1-[4-(1-methylvinyl)-phenyl]propanone], polymethylvinyl ketone, polyvinylaryl ketones, or any combination thereof.

Another exemplary photoinitiator includes benzophenone; anthrone; xanthone; the Irgacure® series of photoinitiators from Ciba-Geigy Corp. including 2,2-dimethoxy-2-phenylacetophenone (Irgacure® 651), 1-hydroxycyclohexylphenyl ketone (Irgacure® 184), or 2-methyl-1-[4-(methylthio)phenyl]-2-moropholino propan-1-one (Irgacure® 907); or any combination thereof. Generally, the photoinitiator exhibits low migration from the material of the elastomeric layer 104. In addition, the photoinitiator typically has a low vapor pressure at extrusion temperatures and sufficient solubility in the polymer or polymer blends of the elastomeric layer 104 to yield efficient crosslinking. In an exemplary embodiment, the vapor pressure and solubility, or polymer compatibility, of the photoinitiator may be improved by derivatizing the photoinitiator. An exemplary derivatized photoinitiator includes, for example, higher molecular weight derivatives of benzophenone, such as 4-phenylbenzophenone, 4-allyloxybenzophenone, 4-dodecyloxybenzophenone, or any combination thereof. In an example, the photoinitiator may be covalently bonded to a polymer of the material of the elastomeric layer 104.

In an exemplary embodiment, the material of the elastomeric layer 104 includes about 0.0 wt % to about 3.0 wt % photoinitiator, such as about 0.1 wt % to about 2.0 wt %.

Crosslinking may also be facilitated by a chemical crosslinking agent, such as a peroxide, an amine, a silane, a sulfur containing compound, or any combination thereof. In an exemplary embodiment, the material of the layer 104 may be prepared by dry blending solid state forms of polymer and the crosslinking agent, i.e., in powder form. Alternatively, the material may be prepared in liquid form, sorbed in inert powdered support or by preparing coated pellets, or the like.

An exemplary thermally activatable crosslinking agent includes a free radical generating chemical, which when exposed to heat decomposes to form at least one, and typically two or more free radicals to effect crosslinking. In an exemplary embodiment, the crosslinking agent is an organic crosslinking agent including an organic peroxide, an amine, a silane, or any combination thereof.

An exemplary organic peroxide includes 2,7-dimethyl-2, 7-di(t-butylperoxy)octadiyne-3,5; 2,7-dimethyl-2,7-di(peroxy ethyl carbonate)octadiyne-3,5; 3,6-dimethyl-3,6-di(peroxy ethyl carbonate)octyne-4; 3,6-dimethyl-3,6-(t-butylperoxy)octyne-4; 2,5-dimethyl-2,5-di(peroxybenzoate) hexyne-3; 2,5-dimethyl-2,5-di(peroxy-n-propyl carbonate) hexyne-3; 2,5-dimethyl-2,5-di(peroxy isobutyl carbonate) hexyne-3; 2,5-dimethyl-2,5-di(peroxy ethyl carbonate) hexyne-3; 2,5-dimethyl-2,5-di(alpha-cumyl peroxy)hexyne-3; 2,5-dimethyl-2,5-di(peroxy beta-chloroethyl carbonate) hexyne-3; 2,5-dimethyl-2,5-di(t-butylperoxy)hexyne-3; or any combination thereof. A particular crosslinking agent is 2,5-dimethyl-2,5-di(t-butyl peroxy)hexyne-3, available from Elf Atochem under the trade designation Lupersol 130. Another exemplary crosslinking agent is dicumyl peroxide, available from Elf Atochem as Luperox 500R. In a particular embodiment, the crosslinking agent is present in the material in an amount between about 0.1 wt % to about 5.0 wt %, such as about 0.5 wt % to about 2.0 wt % based on the weight of the material.

An exemplary silane crosslinking agent has the general formula:

in which R1 is a hydrogen atom or methyl group; x and y are 0 or 1 with the proviso that when x is 1, y is 1; n is an integer from 1 to 12, preferably 1 to 4, and each R independently is a hydrolyzable organic group such as an alkoxy group having from 1 to 12 carbon atoms (e.g., methoxy, ethoxy, butoxy), aryloxy group (e.g., phenoxy), araloxy group (e.g., benzyloxy), aliphatic acyloxy group having from 1 to 12 carbon atoms (e.g., formyloxy, acetyloxy, propanoyloxy), amino or substituted amino groups (e.g., alkylamino, arylamino), or a lower alkyl group having 1 to 6 carbon atoms, with the proviso that not more than one of the three R groups is an alkyl. Such silanes may be grafted to a polymer through the use of an organic peroxide. Additional ingredients such as heat and light stabilizers, pigments, or any combination thereof, also may be included in the material. In general, the crosslinking reaction may result from a reaction between the grafted silane groups and water. Water may permeate into the bulk polymer from the atmosphere or from a water bath or "sauna". An exemplary silane includes an unsaturated silane that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. An example of a hydrolyzable group includes a methoxy group, an ethoxy group, a formyloxy group, an acetoxy group, a proprionyloxy group, an alkyl group, an arylamino group, or any combination thereof. A particular silane is an unsaturated alkoxy silanes that can be grafted onto the polymer. In particular, the silane may include vinyl trimethoxy silane, vinyl triethoxy silane, gamma-(meth)acryloxy propyl trimethoxy silane, or any combination thereof.

The amount of silane crosslinker may vary widely depending upon the nature of the blend, the silane, the processing conditions, the grafting efficiency, the ultimate application, and similar factors. Typically, at least 0.5 parts per hundred resin (phr), such as at least about 0.7 phr, is used. Generally, the amount of silane crosslinker does not exceed 5 phr, such as not greater than about 2 phr.

In another exemplary embodiment, an amine crosslinking agent may include a monoalkyl, duallyl or trialkyl monoamine, wherein the alkyl group contains from about 2 to about 14 carbon atoms; a trialkylene diamine of the formula $N(R^2)_3N$; a dialkylene diamine of the formula $HN(R^2)_2NH$; an alkylene diamine, $H_2NR^2NH_2$; a dialkylene triamine, $H_2NR^2NHR^2NH_2$; an aliphatic amine having a cyclic chain of from four to six carbon atoms; or any combination thereof. The alkylene group $R^2$ in the above formulae may include from about 2 to about 14 carbon atoms. An exemplary cyclic amine may have a heteroatom, such as oxygen, for example, an N-alkyl morpholine. Another exemplary cyclic amine includes pyridine, N,N-dialkyl cyclohexylamine, or any combination thereof. An exemplary amine is triethylamine; di-n-propylamine; tri-n-propylamine; n-butylamine; cyclohexylamine; triethylenediamine; ethylenediamine; propylenediamine; hexamethylenediamine; N,N-diethyl cyclohexylamine; pyridine; ethyl-p-dimethyl amine benzoate (EDAB); octyl-p-dimethyl aminobenzoate (ODAB); or any combination thereof. In an exemplary embodiment, the material includes from about 0.5 wt % to about 10.0 wt % of the amine.

In a particular example, curing is enhanced using FirstCure ITX, available from Albemarle, Inc. FirstCure ITX may also be used in conjunction with an amine synergist, such as ethyl-p-dimethyl amine benzoate (EDAB) or octyl-p-dimethyl aminobenzoate (ODAB).

Returning to FIG. 1, the material of the layer 104 may include a UV absorber. For example, the layer 104 may include not greater than about 5.0 wt % UV absorber, such as about 0.1 wt % to about 5.0 wt % UV absorber. In a particular embodiment, the layer 104 includes at least two UV absorber species. For example, the layer 104 may include between 0.1 wt % to about 2.0 wt % of each of the UV absorber species. As such, the layer 104 may include a cumulative total of about 0.1 wt % to about 5.0 wt % UV absorber.

A UV absorber absorbs electromagnetic radiation having wavelengths below 400 nanometers (nm). Typically, the UV absorber absorbs electromagnetic radiation having wavelengths between 200 nm and 400 nm, such as electromagnetic radiation having wavelengths between 200 nm and 350 nm. Often, a particular species of UV absorber exhibits a peak absorbance at a particular wavelength, termed peak absorbtivity wavelength.

In one exemplary embodiment, the UV absorber is selected from an organic UV absorber class, such as the benzotriazole class, the triazine class, the hindered amine light stabilizer (HALS) class and the oxanilide class. For example, the UV absorber may be a benzotriazole class absorber, such as 2,4-di-tert-butyl-6-(5-chlorobenzotriazol-2-yl) phenol or 2-(2H-benzotriazol-2-yl)-p-cresol. In another example, the UV absorber is of the triazine class, such as 2-(4,6-diphenyl-1,3,5-triazin-2-yl)-5-hexyloxy-phenol. In a further exemplary embodiment, the UV absorber is a HALS UV absorber, such as bis(2,2,6,6,-tetramethyl-4-piperidyl)sebaceate. Other exemplary UV absorbers are available from CIBA Specialty Chemicals, Inc. under the name Tinuvin® or Chemisorb®. In general, the UV absorber is free of non-organic species, such as ceramic species. For example, the UV absorber does not include titanium dioxide or zinc oxide. An exemplary UV absorber is Tinuvin® 1577. Another particular example of a UV absorber includes Tinuvin 327, Tinuvin 360, CGL 777, or any combination thereof. A further exemplary UV absorber includes Tinuvin® P, 2-(2H-benzotriazol-2-yl)-p-cresol The material of the layer 104 may include a filler. An exemplary filler may include talc, calcium carbonate, glass fibers, marble dust, cement dust, clay feldspar, silica or glass, fumed silica, alumina, magnesium oxide, magnesium hydroxide, antimony oxide, zinc oxide, barium sulfate, aluminum silicate, calcium silicate, titanium dioxide, titanates, glass microspheres, chalk, reflective filler such as metal flakes, or any combination thereof. In particular example, the fillers also may act as pigment. For example, the pigment may be an aluminous material, such as alumina or a hydrate of alumina. An alternative example of a filler includes a carbonaceous filler, such as carbon black or graphite. The filler or pigment may be employed in amounts from about 1 wt % to about 90 wt %, such as about 1 wt % to about 80 wt %, or even about 1 wt % to about 40 wt % of the material of the layer 104.

The material of the layer 104 also may include a flame retardant. A flame retardant may include an organic or an inorganic component. An exemplary organic flame retardant includes an organic aromatic halogenated compound, an organic cycloaliphatic halogenated compound, an organic aliphatic halogenated compound, or any combination thereof. An exemplary organic compound may include a brominated or a chlorinated organic molecule. An exemplary embodiment may include hexahalodiphenyl ether, octahalodiphenyl ether, decahalodiphenyl ether, decahalobiphenyl ethane, 1,2-bis(trihalophenoxy)ethane, 1,2-bis(pentahalophenoxy) ethane, hexahalocyclododecane, a tetrahalobisphenol-A, ethylene(N,N')-bis-tetrahalophthalimide, tetrahalophthalic anhydride, hexahalobenzene, halogenated indane, halogenated phosphate ester, halogenated paraffin, halogenated polystyrene, a polymer of halogenated bisphenol-A and epichlorohydrin, or any combination thereof.

An inorganic flame retardant may include a metal compound containing oxygen, such as a hydroxide, an oxide, a carbonate, a silicate, a molybdate, or another compound, such as a mineral compound, or any combination thereof. A typical example may include antimony trioxide, antimony pentoxide, sodium antimonite, hydrated aluminum oxide, zinc oxide, iron oxide, titanium dioxide, aluminum hydroxide, magnesium hydroxide, kaolin, molybdenum trioxide, aluminum silicates, antimony silicates, zinc stannate, magnesium hydroxide, zirconium hydroxide, basic magnesium carbonate, dolomite, hydrotalcite, calcium hydroxide, barium hydroxide, bismuth oxide, tungsten trioxide, a hydrate of tin oxide, a hydrate of an inorganic metallic compound such as borax, zinc borate, zinc metaborate, barium metaborate, zinc carbonate, magnesium carbonate-calcium, calcium carbonate, barium carbonate, magnesium oxide, molybdenum oxide, zirconium oxide, tin oxide, red phosphorous, a ceramic material, or any combination thereof. The flame retardant may be used alone or in a combination of two or more thereof. Grain size of the flame retardant varies with the particular species, but with regard to magnesium hydroxide, aluminum hydroxide and the like, the average grain size is preferably 20 µm or less, more preferably within the range of 0.3 to 5.0 µm.

In an exemplary embodiment, the flame retardant may be included in the material of the layer 104 in a blend including at least three components. In a particular embodiment, the blend may include a metal oxide, a hydrated agent, such as a hydrated metal oxide, and a glass forming compound or vitrifying agent, such as a metal borate or metal silicate. For example, the flame retardant blend may include iron oxide, hydrated alumina, such as alumina trihydrate (ATH), and zinc borate. The flame retardant blend may be included in the material in amounts not to exceed 20 wt %, such as not greater than about 15 wt %. In one particular embodiment, the blend of flame retardants includes iron oxide, such as $Fe_2O_3$ in an amount at least about 0.1 wt % and not greater than 5.0 wt % of the polymer composite, alumina trihydrate in an amount at least about 0.1 wt % and not greater than 5.0 wt % of the polymer composite, and zinc borate in an amount at least about 0.1 wt % and not greater than 5.0 wt % of the polymer composite. In one example, the polymer composite includes iron oxide in an amount between 1.0 wt % and 4.0 wt %. In another exemplary embodiment, the polymer composite includes ATH in an amount between about 1.0 wt % and 4.0 wt %. In a further exemplary embodiment, the polymer composite includes zinc borate in an amount between about 1.0 wt % and about 4.0 wt %.

Returning to FIG. 1, the layer 104 may have a thickness not greater than about 1 millimeter (mm). In a particular example, the layer 104 is not greater than about 500 micrometers, such as not greater than about 250 micrometers, or even, not greater than about 100 micrometers.

In an exemplary embodiment, the layer 102 and the layer 104 may be bonded directly to and directly contacting each other. For example, the layer 102 and the layer 104 may be coextruded so as to directly contact each other without intervening layers. The layer 104 may be cured or cross-linked, improving the bond between the layer 102 and 104.

In a further example, an optional layer 106 is bonded to the layer 104. For example, the layer 106 may directly contact and be directly bonded to the layer 104 without an intervening layer. Alternatively, the layer 106 may be bonded to the layer 104 with an intervening adhesive. The layer 106 may include reinforcement, an adhesive agent, a polymer component, or any combination thereof. For example, the layer 106 may include reinforcement, such as metallic films, random fibrous reinforcement, woven reinforcement, or any combination thereof. In particular, the reinforcement may include fiberglass, metallic strands, or polymeric fibers, such as polyester, aramid, or polyolefin fibers, or any combination thereof.

In another example, the optional layer 106 may include adhesive materials. For example, the layer 106 may include a blend of polyolefin and adhesive material. An exemplary adhesive material includes a modified polyolefin, ethylene vinyl acetate, acrylic polymer, epoxy, or any combination thereof. In particular, the adhesive material may include maleic anhydride modified polyolefin. In another example, the adhesive material may include ethylene vinyl acetate with a peroxide agent.

In a further example, the layer 106 may be a coloring layer. For example, the layer 106 may include an unfunctionalized olefinic polymer and pigment or colorant. In addition, the layer 106 may include a UV absorber. Further, the layer 106 may include a catalyst, an initiator, an absorber, filler, a pigment, a colorant, an anti-oxidant, a flame retardant, a plasticizer, or any combination thereof.

In an exemplary embodiment, the multi-layer film 100 forms a capping layer that may be bonded to a bulk layer. For example, the layer 102 may include FEP and the layer 104 may include EPDM. In another example, the layer 102 includes FEP and the layer 104 includes polyolefin homopolymer or copolymer. Optionally, the multi-layer film 100 may include the layer 106 formed of a blend of EPDM or polyolefin and pigment or fillers.

In another example, the multi-layer film 100 forms a capping layer. For example, the layer 102 may include a fluoropolymer, such as FEP, PVDF, or ETFE, the layer 104 may include an EPDM elastomer, and the optional layer 106 may include an EPDM elastomer and pigment.

In a further example, the layer 102 includes a fluoropolymer, the layer 104 includes a polyolefin, and the layer 106 includes EPDM. In an additional example, the layer 102 includes a fluoropolymer, the layer 104 includes EPDM, and the layer 106 includes polyolefin.

While layer 102 is illustrated as an external layer, an optional fluorpolymer layer may overlie layer 102. In addition, the layer 106 may be bonded directly to the layer 104. Alternatively, optional layers may intervene between the layer 104 and the layer 106.

Figure 2:
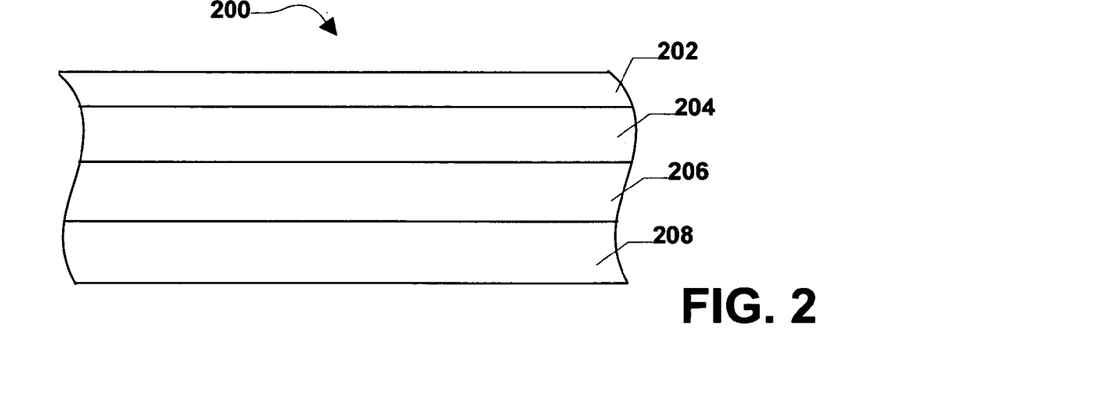

In an additional example, FIG. 2 includes an illustration of an exemplary capping film 200. The capping film 200 may include a layer 202 formed of fluoropolymer and a layer 204 bonded directly to and directly contacting the layer 202 and including unfunctionalized olefinic polymer. While the layer 204 is depicted as a single layer, the layer 204 may be one or more layers.

In addition, the capping film 200 includes an adhesive layer 206. In an exemplary embodiment, the adhesive layer may be covered by a release film 208 during transport. The release film 208 may be releasably attached to the layer 206 and may be removed prior to adhering the capping film to the bulk layer. Alternatively, the capping film 200 is free of the layer 206 and the release film 208 directly contacts the layer 204. For example, the layer 204 may be an uncured or partially cured unfunctionalized olefinic polymer (i.e., at least partially uncured unfunctionalized olefinic polymer) that may be cured to bond to a bulk layer.

The capping film may be coupled to a bulk layer. For example, FIG. 3 includes an illustration of a roof membrane 300 including a capping film 302 and a bulk layer 304 coupled to the capping film 302. As illustrated, the capping film 302 may form a surface 306 to be exposed to the environment and the bulk layer 304 may form a surface 308 to be placed in contact with a building or structure. The bulk layer 304, for example, may underlie the capping film 302. While the bulk layer 304 is illustrated as a single layer, the bulk layer 304 may be formed of multiple layers.

Figure 3:
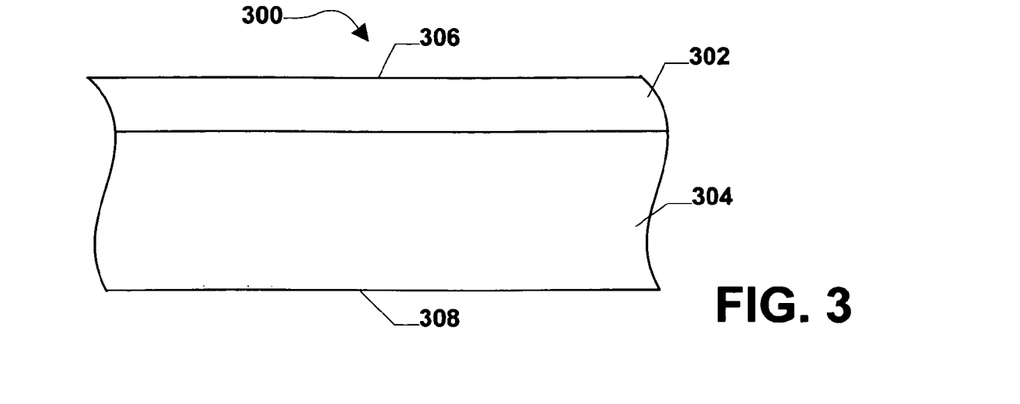

In an example, the bulk layer 304 may be adhered to the capping film 302 with an adhesive. In a particular embodiment, an adhesive layer includes a bonding agent. An exemplary bonding agent includes an acrylic polymer. A particular exemplary acrylic polymer includes a homopolymer, copolymer, or blend formed of monomers such as methyl acrylate, methyl methacrylate, ethyl methacrylate, or any combination thereof. The acrylic polymer may be an impact modified acrylic polymer. For example, the acrylic polymer may include an elastomeric material, such as in a core/shell configuration. Another exemplary bonding agent includes a modified polyolefin or a modified ethylene vinyl acetate. An exemplary modified polyolefin includes maleic anhydride modified polyethylene. An exemplary modified ethylene vinyl acetate including maleic anhydride modified ethylene vinyl acetate. In a further example, the adhesive layer may include a copolyamide adhesive, a copolyester adhesive, a polyurethane adhesive, or any combination thereof. Alternatively, the bulk layer 304 may be bonded directly to an unfunctionalized olefinic polymer layer of the capping film 302.

The bulk layer 304 can include a polymeric material. For example, the polymeric material can include an elastomeric material, such as an elastomeric thermoplastic polymeric material or an elastomeric thermoset polymeric material. In particular, the polymeric material may include a diene elastomer, a thermoplastic olefin, a thermoplastic elastomer (TPE), polyvinyl chloride, a chlorosulfonated polyethylene, a ketone ethylene ester, or any combination thereof.

In an exemplary embodiment, the bulk layer 304 includes an elastomeric material or a thermoplastic polyolefin. In a particular example, the bulk layer 304 may include an unfunctionalized olefinic polymer. For example, the bulk layer 304 may include a diene elastomer, such as EPDM. In another example, the bulk layer 304 may include a polyolefin. In a further example, the bulk layer 304 may include a blend of polyolefin and diene elastomer. In particular, the bulk layer 304 may include the unfunctionalized olefinic polymer in the compositions described in relation to layer 104 above.

In a particular embodiment, the capping film 302 includes an unfunctionalized olefinic polymer and the bulk layer 304 includes an unfunctionalized olefinic polymer. The unfunctionalized olefinic polymer of the capping film 302 may have the same composition as the unfunctionalized olefinic polymer of the bulk layer 304. Alternatively, the bulk layer 304 and the capping film 302 may include unfunctionalized olefinic polymers that are different from each other.

In addition, the bulk layer 304 may include filler. For example, the bulk layer 304 may include talc, calcium carbonate, glass fibers, marble dust, cement dust, clay feldspar, silica or glass, fumed silica, alumina, magnesium oxide, magnesium hydroxide, antimony oxide, zinc oxide, barium sulfate, aluminum silicate, calcium silicate, titanium dioxide, titanates, glass microspheres, chalk, or any combination thereof. In particular example, the fillers also may act as pigment. For example, the pigment may be an aluminous material, such as alumina or a hydrate of alumina. An alternative example of a filler includes a carbonaceous filler, such as carbon black or graphite. The filler or pigment may be employed in amounts from about 1 wt % to about 90 wt %, such as from about 10 wt % to about 80 wt %, or even from about 20 wt % to about 50 wt % of the material of the layer 304.

Further, the bulk layer 304 may include a processing aid, an extender oil, antioxidant, antiozonant, flame retardant, pigment, a curing agent, or any combination thereof. In particular, the bulk layer 304 may include a curing agent, such as one or more of the crosslinking agents, thermal initiators, or photoinitiators described above.

In a particular embodiment, the bulk layer 304 includes about 10 wt % to about 80 wt % EPDM, such as about 20 wt % to about 50 wt % EPDM, or even about 25 wt % to about 40 wt % EPDM. In addition, the bulk layer 304 may include about 20 wt % to about 80 wt % carbon black, such as about 20 wt % to about 50 wt % carbon black. Further, bulk layer 304 may include about 10 wt % to about 35 wt % extender oils; about 1 wt % to about 10 wt % curing agents, antioxidants, processing aids, or any combination thereof; or any combination thereof.

In another exemplary embodiment, the bulk layer 304 includes about 20% to about 80% polyolefin, such as about 30 wt % to about 60 wt % polyolefin, or even about 40 wt % to about 60 wt % polyolefin. In addition, the bulk layer 304 may include about 10 wt % to about 60 wt % of a filler or inorganic flame retardant, such as a hydrated metal oxide or a metal hydroxide. For example, the inorganic flame retardant may include a flame retardant, such as alumina hydrate or magnesium hydroxide.

While not illustrated, the multi-layer membrane 300 may include a reinforcing layer. The reinforcing layer may form an underlying surface. Alternatively, the reinforcing layer may be formed between the capping film 302 and the bulk layer 304. In a further exemplary embodiment, the reinforcing layer may be formed within the bulk layer 304. Alternatively, the reinforcing layer may be formed as part of the capping film 302. For example, the reinforcing layer may be formed of a fibrous material, such as fiberglass, polymeric fibers, or metallic strands. In an example, a polymeric fiber includes a polyester fiber, an aramid fiber, a polyimide fiber, a polyolefin fiber, or any combination thereof. In an exemplary embodiment, the reinforcing material may be a random fiber mat, random fibers adhered by an elastomeric material, or a woven material. For example, the reinforcing material may be a woven material, such as a woven fiberglass material or a woven polymeric fiber material.

In an exemplary embodiment, the thickness of the membrane 300 is at least about 1.0 mm. In a particular example, the thickness is not greater than about 10.0 mm. For example, the thickness may be not greater than about 5.0 mm, such as not greater than about 2.5 mm or, in particular, not greater than about 1.5 mm. In an embodiment that includes reinforcement, either incorporated within the membrane 300 or bonded to the underlying surface of the membrane 300, the thickness of the layers overlying the reinforcement is at least about 0.30 mm, such as at least about 0.35 mm, at least about 0.40 mm, or even at least about 0.75 mm.

In an exemplary embodiment, the tensile strength of the membrane 300 is at least about 9.0 MPa, such as at least about 15.0 MPa or even, at least about 20.0 MPa. In an exemplary embodiment that includes reinforcement, the break strength is at least about 400 N, such as at least about 420 N or even, at least about 450 N. In a particular embodiment, the break strength is at least about 950 N.

As formed without reinforcement, the ultimate elongation of the membrane 300 may be at least about 250%. For example, the ultimate elongation of the membrane 300 as formed may be at least about 300% or even, at least about 320%. After heat aging, the ultimate elongation of the membrane 300 may be at least about 200%. For example, after heat aging at 166° C. for a period of 670 hours, the ultimate elongation may be at least about 200%, such as at least about 220%. When the membrane 300 includes reinforcement, the elongation may be at least about 15%.

The tear resistance of the membrane 300 may be at least about 25 kN/m, such as at least about 27 kN/m or at least about 29 kN/m. In an exemplary embodiment that includes reinforcement, the membrane 300 may have a tear strength of at least about 45 N, such as at least about 50 N or even, at least about 55 N. After heat aging, the tear resistance of the membrane 300 may be at least about 21.9 kN/m and the tensile strength may be at least about 8.3 MPa. For example, after heat aging at 166° C. for a period of 670 hours, the tear resistance may be at least about 21.9 kN/m and the tensile strength may be at least about 8.3 MPa. For a reinforced membrane, the break strength may be at least about 355 N, such as at least about 375 N.

In general, the membrane 300 may met or exceed the parameters outlined in the ASTM D 4637-04 standard when the polymer content of layer 304 is substantially EPDM. Typically, the membrane 300 exhibits improved performance for weather resistance and heat resistance than the parameters outlined in ASTM D 4637-04. Alternatively, the membrane 300 may met or exceed the parameters outlined in the ASTM D 6878-03 standard when the polymer content of layer 304 is predominantly thermoplastic olefin.

Once formed, the film may be rolled for easy storage and merchandising. For example, FIG. 4 includes an illustration of an exemplary roofing membrane or roofing material 400 in the form of a roll 402. The roofing membrane 400 may include at least two layers 404 and 406. For example, the layer 404 may be a capping film that includes a low surface energy material, such as a fluoropolymer. The layer 406 may form a bulk layer that includes an elastomeric material, such as EPDM or a thermoplastic olefin.

Figure 4:
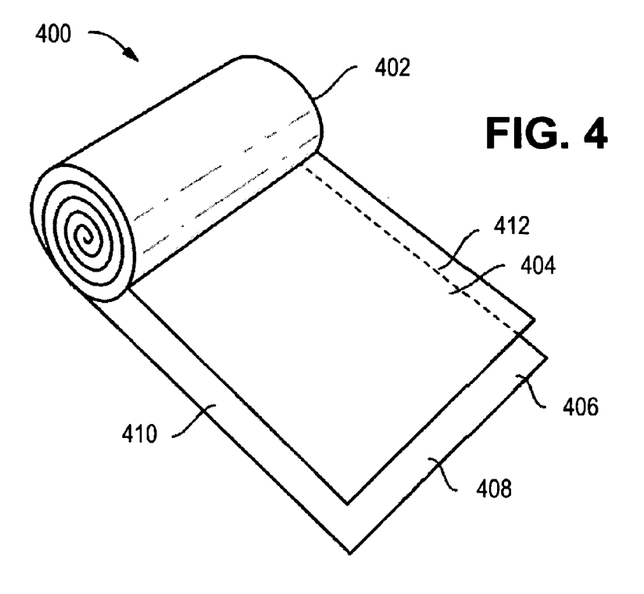
FIG. 4 includes an illustration of an exemplary roofing membrane.

In the illustrative embodiment, the roofing membrane or roofing material 400 includes a terminal flap or tab 408 and a side flap or tab 410. The flaps or tabs 408 and 410 may be free of low surface energy material. For example, the layer 404 may at least partially overlie the layer 406. In a particular example, a portion of the layer 406 extends beyond an edge of the layer 404, forming the tab. In another exemplary embodiment, the roofing membrane 400 may include a flap 412 that includes at least the material of layer 404. For example, the layer of 404 may extend beyond an edge of the layer 406, forming the flap or tab 412. During installation, the flap 412 or an additional film may be placed over the flap 410 of an adjacent sheet of the roofing membrane 400. The flaps may include adhesive, such as partially cured diene elastomer. During installation, the adhesive may be cured, bonding adjacent sheets of film together and reducing seams through which water may seep.

Alternatively, a flap, such as a flap 410, may extend from both sides of the membrane or material 400. The roofing membrane 400 may be placed adjacent another roofing membrane to form a butt joint that may be covered with a tape or capping film. The tape or capping film may be adhered to the butt joint with an adhesive. For example, the capping film may include an adhesive layer.

Figure 5:
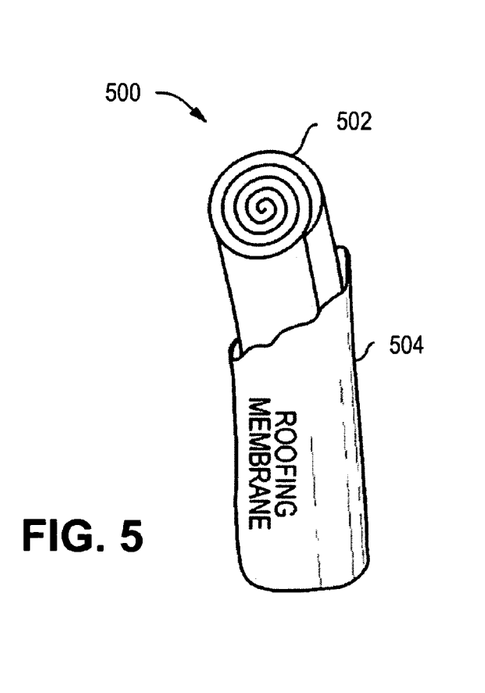
FIG. 5 includes an illustration of an exemplary manufactured article that includes a roofing membrane.

The rolls of film may be sold as a merchandised article, such as the merchandised article 500 illustrated in FIG. 5. The merchandised article 500 may include a roll of the roofing membrane 502 and a mark indicating use of the membrane as a roofing material. For example, the merchandised article 500 may include packaging 504 having writing or markings indicating that the packaged roll 502 is a roofing membrane. Alternatively, a marking or indicator, such as lettering, may be printed on the roll 502. In a further exemplary embodiment, the marking or indicator may be a tag wrapped around the roll 502 or attached to a band securing the roll 502.

In an exemplary embodiment, the roofing material may be formed by bonding a capping film and a bulk layer or film. For example, a capping film may be formed separately from a bulk layer and the capping film and bulking layer may be thermally bonded or laminated with an intervening adhesive layer. The intervening adhesive layer may be added during the laminating process or formed as part of the bulk layer or of the capping film.

Figure 6:
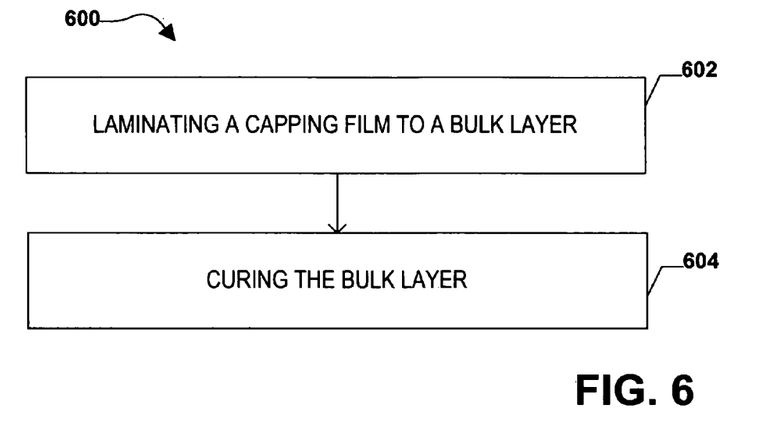
FIG. 6 includes a flow chart of an exemplary method to form a roofing membrane.

Alternatively, the capping film may include a layer configured to bond to the material of the bulk layer. As illustrated in FIG. 6, a capping layer may be laminated to a bulk layer, as illustrated at 602. For example, the bulk layer may be extruded onto a preformed capping film. Alternatively, an uncured bulk layer may be laminated to a preformed capping film. The capping film, for example, may include an uncured layer to contact the bulk layer. In another example, the capping film may include a partially cured layer, such as a partially cured EPDM layer.

The bulk layer may be cured, as illustrated at 604. As a result, the bulk layer may bond to the capping film. For example, an uncured or partially cured layer of the capping film (i.e., an at least partially uncured layer) may bond to the bulk layer through curing. In a particular example, the bulk layer may be cured through a radiation method as described above, such as UV irradiation, gamma irradiation, or electron beam curing, through a thermal method, or any combination thereof. In an example, the bulk layer is cured through UV irradiation. In another example, the bulk layer is cured through thermal treatment. In a further example, the bulk layer is cured through exposure to an electron source.

In a further example, the capping film may be laminated to a previously installed bulk layer. For example, the capping film may be used to retrofit existing roofing structures. In a particular example, an existing roofing membrane may be cleaned and the capping film may be laminated to the existing roofing membrane. For example, an adhesive may be used to bond the capping film to the roofing membrane. In another example, the capping film may include an uncured or partially cured layer (i.e., an at least partially uncured layer) that is cured to bond the capping film to the roofing membrane. In a particular example, the roofing membrane may include an unfunctionalized olefinic polymer. In another exemplary embodiment, a bulk layer is bonded to a roofing structure and the capping film is laminated to the bulk layer in-place.

Figure 7:
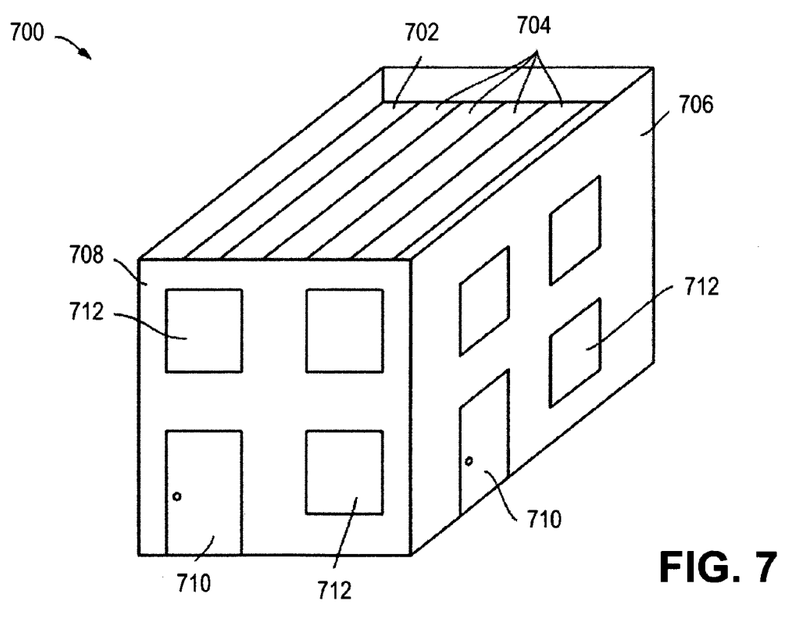
FIG. 7 includes an illustration of an exemplary building including a roofing membrane, such as the roofing membrane illustrated in FIG. 1, 2 or 3.

The roofing material may be installed on a building, as illustrated at FIG. 7. For example, a building 700 may include outdoor surfaces 702, 706 and 708. In a particular example, the skyward facing surface 702 is covered with a roofing membrane 704. As illustrated, the skyward facing surface 702 is a low slope surface. For example, a low slope surface may have a slope not greater than about 100. Generally, low slope roofing is useful in large commercial buildings. In an alternative embodiment, the skyward facing surface 702 may be a sloped roof. Generally, sloped roof systems are useful in residential structures.

While the membrane 704 is illustrated in connection with the skyward facing surface 702, the membrane 704 also may be installed on vertical surfaces 706 or 708. Such vertical surfaces 706 or 708 may include windows 712 and doors 710. When installed on vertical surfaces, such as the surfaces 706 and 708, the multi-layer membrane is installed on regions of the surface that do not include the windows 712 or the doors 710.

Figure 8:
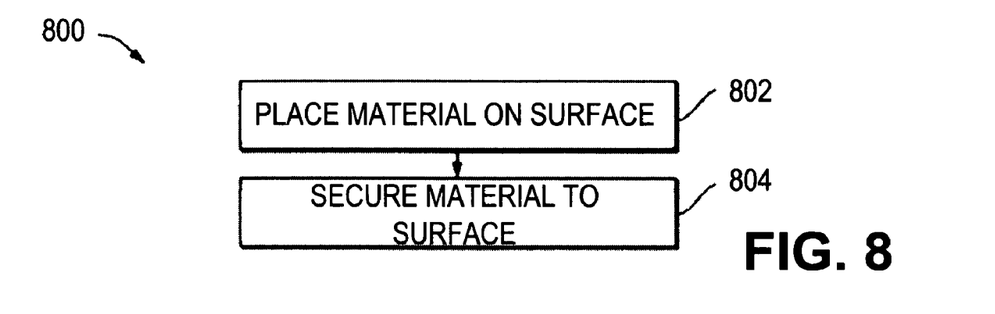
FIG. 8 includes a flow chart illustrating an exemplary method for installing a roofing membrane.

FIG. 8 includes an illustration of an exemplary method for installing a multi-layer membrane. The method 800 includes placing a multi-layer membrane on a surface, as illustrated at 802. For example, the surface may be a skyward facing surface of a commercial building. Such surfaces are typically low-slope roofs. However, the membrane may also be placed over a sloped roof, such as the roofs typically used in residential real estate. In a particular embodiment, the films are unrolled to form elongated sheets lying side by side over the roof.

The membrane may be secured to the surface, as illustrated at 804. For example, the membrane may be secured to the roof using an adhesive. In a particular embodiment, the membrane may be secured using a hot tar or pitch as adhesive. The membrane may be placed over the hot tar of pitch and the hot tar or pitch allowed to cool. In an alternative embodiment, the membrane may be thermally secured to the surface. For example, the membrane may be heated to a softening or melting point and pressed onto the roof surface. In such a manner, thermal plastic portions of the multi-layer membrane may adhere to the roof. In another example, heating the membrane may activate thermal curing agents within the membrane, resulting in bonding of the membrane to the roof structure. In alternative embodiments, the membrane may be secured to the roof using a mechanical method such as nails, screws, or flushings.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A roofing material comprising:
   a first layer comprising a fluoropolymer and having a thickness of not greater than 50 micrometers;
   a second layer directly bonded to and directly contacting the first layer, the second layer comprising at least 50 wt % of an unfunctionalized olefinic polymer, the second layer having a thickness of not greater than 500 micrometers; and
   a third layer adjacent the second layer on an opposite side of the second layer to the first layer, the third layer comprising a polymeric material and a filler.

2. The roofing material of claim 1, further comprising an adhesive layer between the second layer and the third layer.

3. The roofing material of claim 1, wherein the second layer includes an ultraviolet radiation absorber.

4. The roofing material of claim 1, wherein the second layer includes a photoinitiator.

5. The roofing material of claim 1, wherein the second layer includes a thermal initiator.

6. The roofing material of claim 1, further comprising a reinforcement.

7. The roofing material of claim 1, wherein the unfunctionalized olefinic polymer and the polymeric material have the same composition.

8. The roofing material of claim 1, wherein the unfunctionalized olefinic polymer includes a diene elastomer.

9. The roofing material of claim 1, wherein the unfunctionalized olefinic polymer includes a polyolefin.

10. The roofing material of claim 1, wherein the first layer includes at least about 70 wt % of the fluoropolymer.

11. The roofing material of claim 10, wherein the first layer is formed substantially entirely of the fluoropolymer.

12. The roofing material of claim 1, wherein the fluoropolymer includes fluorinated ethylene propylene copolymer (FEP).

13. The roofing material of claim 1, wherein the second layer includes a pigment.

14. The roofing material of claim 1, wherein the roofing material has an ultimate elongation of at least about 25000.

15. The roofing membrane of claim 1, wherein the second layer comprises at least 80 wt % of the unfunctionalized olefinic polymer.

* * * * *

UNITED STATES PATENT AND TRADEMARK OFFICE
CERTIFICATE OF CORRECTION

PATENT NO. : 7,641,964 B2
APPLICATION NO. : 11/498942
DATED : January 5, 2010
INVENTOR(S) : Gwo S. Swei et al.

It is certified that error appears in the above-identified patent and that said Letters Patent is hereby corrected as shown below:

Title Page, Item (73) Assignee, please delete "Worcester, MA" and insert therefor --Aurora, OH--.

Column 18, Line 12, please delete "25000" and insert therefor --250%--.

Signed and Sealed this
Twenty-ninth Day of January, 2013

David J. Kappos
*Director of the United States Patent and Trademark Office*